(12) United States Patent
Nagasawa et al.

(10) Patent No.: US 7,794,641 B2
(45) Date of Patent: Sep. 14, 2010

(54) METHOD FOR PRODUCING GOLF BALL

(75) Inventors: Hiroyuki Nagasawa, Chichibu (JP); Yoshinori Egashira, Chichibu (JP); Yoshihiro Yamana, Chichibu (JP); Hidekazu Saito, Chichibu (JP); Hiroki Kimura, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 12/511,423

(22) Filed: Jul. 29, 2009

(65) Prior Publication Data

US 2009/0286939 A1 Nov. 19, 2009

Related U.S. Application Data

(62) Division of application No. 11/120,957, filed on May 4, 2005, now Pat. No. 7,601,290.

(51) Int. Cl.
*B29C 45/14* (2006.01)

(52) U.S. Cl. ............... 264/275; 264/279.1; 264/328.17

(58) Field of Classification Search ............... None
See application file for complete search history.

(56) References Cited

U.S. PATENT DOCUMENTS

| | | | |
|---|---|---|---|
| 3,395,109 A | 7/1968 | Molitor et al. | |
| 4,248,432 A | 2/1981 | Hewitt et al. | |
| 4,347,338 A | 8/1982 | Torli et al. | |
| 4,376,834 A | 3/1983 | Goldwasser et al. | |
| 4,442,282 A | 4/1984 | Kolycheck | |
| 5,006,297 A | 4/1991 | Brown et al. | |
| 5,318,813 A | 6/1994 | Flexman, Jr. | |
| 5,334,673 A | 8/1994 | Wu | |
| 5,733,428 A | 3/1998 | Calabria et al. | |
| 5,888,437 A | 3/1999 | Calabria et al. | |
| 5,897,884 A | 4/1999 | Calabria et al. | |
| 5,929,189 A | 7/1999 | Ichikawa et al. | |
| 5,947,843 A | 9/1999 | Calabria et al. | |
| 6,117,024 A | 9/2000 | Dewanjee | |
| 6,123,628 A | 9/2000 | Ichikawa et al. | |
| 6,190,268 B1 | 2/2001 | Dewanjee | |
| 6,582,325 B1 | 6/2003 | Ichikawa et al. | |
| 6,747,100 B2 | 6/2004 | Ichikawa et al. | |
| 7,008,333 B2 | 3/2006 | Takesue et al. | |

FOREIGN PATENT DOCUMENTS

| | | |
|---|---|---|
| JP | 58-2063 B2 | 1/1983 |
| JP | 9-271538 A | 10/1997 |
| JP | 11-178948 A | 7/1999 |
| JP | 2002-336378 A | 11/2002 |

*Primary Examiner*—Edmund H. Lee
(74) *Attorney, Agent, or Firm*—Sughrue Mion, PLLC

(57) ABSTRACT

A method of manufacturing golf balls composed of a core and a cover of one or more layer that encloses the core, at least one cover layer being made of a thermoplastic polyurethane composition characterized by including at least 90 wt % of a thermoplastic polyurethane obtained by a polyurethane-forming reaction of an organic diisocyanate compound with a long-chain polyol and a chain extender, which thermoplastic polyurethane composition cover layer has an inherent viscosity in a DMF solvent of larger than 1.5 dl/g and an inherent viscosity in a 0.05 mol/L n-butylamine-containing DMF solution of larger than 0.5 dl/g, the golf ball manufacturing method being characterized by:

conditioning the thermoplastic polyurethane to a pre-processing moisture content of 500 ppm or less, then injection molding the moisture-conditioned thermoplastic polyurethane to form the thermoplastic polyurethane composition cover layer. Golf balls produced by this method have a high rebound and excellent spin characteristics and scuff resistance, are recyclable in a molding operation, and have excellent manufacturability.

2 Claims, No Drawings

METHOD FOR PRODUCING GOLF BALL

CROSS-REFERENCE

This is a divisional of U.S. application Ser. No. 11/120,957, filed May 4, 2005, now U.S. Pat. No. 7,601,290. The entire disclosure is hereby incorporated by reference.

BACKGROUND OF THE INVENTION

The present invention relates to a method of manufacturing golf balls in which a specific thermoplastic polyurethane composition is used in the cover. More specifically, the invention relates to a method of manufacturing golf balls in which a thermoplastic polyurethane composition that is recyclable in a molding operation is used in the cover, which golf balls have a high rebound, excellent spin characteristics and scuff resistance, and an excellent manufacturability.

The use of polyurethane materials as golf ball cover materials has received some attention in recent years. Polyurethane materials are broadly divided, based on the process used to make molded articles therefrom, into thermoset polyurethane materials and thermoplastic polyurethane materials. Molded articles made of thermoset polyurethane materials can be obtained by mixing under applied heat a urethane prepolymer having isocyanate end groups with a liquid starting material such as a polyol or a polyamine as the curing agent, then pouring the mixture directly into a mold and heating to effect a urethane curing reaction.

Numerous golf balls which use such a thermoset polyurethane material have been disclosed in the prior art (e.g., Patent Document 1: U.S. Pat. No. 5,334,673, Patent Document 2: U.S. Pat. No. 6,117,024, and Patent Document 3: U.S. Pat. No. 6,190,268). Methods of molding thermoset polyurethane materials are described in, for example, Patent Document 4: U.S. Pat. No. 5,006,297, Patent Document 5: U.S. Pat. No. 5,733,428, Patent Document 6: U.S. Pat. No. 5,888,437, Patent Document 7: U.S. Pat. No. 5,897,884, and Patent Document 8: U.S. Pat. No. 5,947,843.

Because moldings made of thermoset polyurethane materials lack plasticity when heated, the starting materials and molded articles cannot be recycled. Moreover, given the length of the heating and curing step and of the cooling step and given the difficulty of controlling the molding time owing to the high reactivity under heating and the instability of the starting materials, the manufacturability of specialty moldings such as golf ball covers (moldings which enclose a core material) made of thermoset polyurethane materials is regarded as inefficient.

By contrast, moldings made of thermoplastic polyurethane materials are not obtained by directly reacting the starting materials. Instead, a linear polyurethane material synthesized using starting materials and a production method which differ somewhat from those for the thermoset polyurethane materials described above is employed in the molding operation. Such a polyurethane material is thermoplastic, and thermoplasticized polyurethane materials are of a nature as to solidify on cooling. Such polyurethane materials can thus be molded using an injection molding machine. The injection molding of thermoplastic polyurethane materials requires a much shorter molding time than thermoset polyurethane materials and moreover is suitable for precision molding, making it ideal as a process for molding golf ball covers. In addition, thermoplastic polyurethane materials are recyclable and are friendly to the global environment. Golf balls made using thermoplastic polyurethane materials are disclosed in, for example, Patent Document 9: U.S. Pat. No. 3,395,109, Patent Document 10: U.S. Pat. No. 4,248,432 and Patent Document 11: U.S. Pat. No. 4,442,282.

However, prior-art golf ball covers made with thermoplastic polyurethane materials have been unable to satisfy at the same time requirements for feel on impact, controllability, rebound and scuff resistance when hit with an iron.

To address this need, Patent Document 12: JP-A 9-271538 discloses a golf ball cover made using a high-resilience thermoplastic polyurethane material. Yet, even this golf ball cover falls short in terms of its scuff resistance when hit with an iron.

Patent Document 13: JP-A 11-178949 describes a golf ball cover which has a relatively good scuff resistance when hit with an iron and is composed primarily of the reaction product of a thermoplastic polyurethane material with an isocyanate compound. In this cover, an isocyanate compound such as a diisocyanate or a block isocyanate dimer is added as an additive to the thermoplastic polyurethane material. Addition is carried out during melt mixing under applied heat using an extruder or during injection molding, with the reaction being effected during molding.

However, in the molding of a cover according to JP-A 11-178949 above, the isocyanate compound is hard to handle because it loses its activity in the presence of moisture, thus making it difficult to obtain a stable reaction product. In the case of blocked isocyanates, which are highly resistant to moisture absorption, the blocking agent that dissociates under heating has a strong odor, making it unsuitable for use in molding covers. Moreover, when the isocyanate compound is in the form of a powder or a solution, it is difficult to control the amount of addition to the thermoplastic polyurethane material, making control of the golf ball cover properties a challenge. Furthermore, owing to melting point and melt viscosity differences between the thermoplastic polyurethane material and the isocyanate compound, slippage arises within the molding machine, which sometimes makes thorough kneading impossible to achieve. In this prior art, for the reasons given above, control of the effects of moisture within the cover material and of the amount of additive included therein has been inadequate, making it impossible to achieve golf ball covers which are fully satisfactory in terms of their scuff resistance-improving effects.

The preferred thermoplastic polyurethane material described in JP-A 11-178949 is based on an aliphatic isocyanate. However, this thermoplastic polyurethane material has a very large reactivity with isocyanate, making the reaction difficult to control. As a result, one problem is that gelation tends to arise before the mixture is used in injection molding, making it impossible to ensure sufficient plasticity. Another problem is that gelation sometimes occurs during the molding operation. Yet another problem is that the resin being recycled sometimes gels, as a result of which reclamation becomes impossible. These problems have made it difficult to put the above technology to practical use.

Patent Document 14: JP-B 58-2063 (U.S. Pat. No. 4,347,338) describes a method of manufacturing thermoset polyurethane molded articles which involves intimately mixing a compound bearing two or more isocyanate groups with a thermoplastic resin which does not react with isocyanate groups, blending the resulting mixture with a thermoplastic polyurethane material, then furnishing the blend to a molding machine and molding. However, the objects of this prior art are simply to improve the resistance to solvents and to continuous and repeated friction; the published specification does not indicate the use of this prior-art molding material as a golf ball cover material. Accordingly, there continues to exist a desire for a golf ball cover material which can satisfy a number of properties required of golf balls; i.e., rebound, distance, spin characteristics, controllability, feel on impact, scuff resistance, cut resistance, and discoloration resistance.

Patent Document 15: JP-A 2002-336378 discloses a golf ball which uses a cover stock composed of a thermoplastic polyurethane material and an isocyanate mixture. This cover stock is a thermoplastic polyurethane material which is recyclable and has a high rebound and an excellent scuff resistance. Although such cover stock exhibits both the good manufacturability of a thermoplastic polyurethane and physical properties on a par with those of thermoset polyurethanes, it also has a number of drawbacks, including the formation of scorched material when the isocyanate mixture is charged into the molding machine and a poor molding stability.

SUMMARY OF THE INVENTION

It is thus an object of this invention to provide a method of manufacturing golf balls which have a high rebound, excellent spin characteristics and scuff resistance, are recyclable in a molding operation, and have excellent manufacturability.

As a result of extensive investigations, we have found that the above problems can be resolved by a method of manufacturing golf balls composed of a core and a cover of one or more layer that encloses the core, at least one cover layer being made of a thermoplastic polyurethane composition composed primarily of a thermoplastic polyurethane obtained by a polyurethane-forming reaction among a long-chain polyol, an organic diisocyanate compound and a chain extender, which an inherent viscosity in a DMF solvent of a cover layer is larger than 1.5 dl/g and an inherent viscosity in a 0.05 mol/L n-butylamine-containing DMF solution of a cover layer is larger than 0.5 dl/g, the golf ball manufacturing method being characterized by conditioning the thermoplastic polyurethane to a pre-processing moisture content of 500 ppm or less, then injection molding the moisture-conditioned thermoplastic polyurethane to form the thermoplastic polyurethane composition cover layer.

In the manufacturing method of the invention, the thermoplastic polyurethane is conditioned to a pre-processing moisture content of 500 ppm or less. When thermoplastic polyurethane is thermally processed (e.g., injection molded), to avoid undesirable effects such as foaming of the resin during the molding operation, it is desirable for the polyurethane to be dried at 80 to 90° C. for 1 to 2 hours prior to processing (Poriuretan jushi [Polyurethane Resins] by Keiji IWATA, published by Nikkan Kogyo Shimbun, Ltd., p. 165). However, in light of the property requirements for golf ball covers, I have found from investigations that further limiting the moisture content within the above range is desirable, particularly from the standpoint of stability during injection molding and the resin properties after molding.

Similarly, in the inventive method of manufacture, it is also possible to use recyclable material composed of the above thermoplastic polyurethane composition, in which case the recyclable thermoplastic polyurethane is conditioned to a pre-processing moisture content of 5,000 ppm or less. Moreover, I have found that limiting the pre-processing moisture content of the recyclable polyurethane to the above moisture content is desirable for suppressing a rise in viscosity during molding.

Also, in the inventive method of manufacture, after covering the core with the thermoplastic polyurethane composition, it is advantageous to administer heat treatment for efficient hardness recovery and to promote crosslinking. In the prior art, to achieve a good hardness recovery, heat treatment of the molded article has often been carried out using hot-air treatment or oven treatment. In the present invention, when heat treatment is carried out on the above thermoplastic polyurethane composition, I have found that carrying out heat treatment in the presence as well of moisture unexpectedly contributes to the formation of strong crosslinks, namely urea bonds and biuret bonds, and provides enhanced scuff resistance.

Accordingly, the invention provides the following golf balls.

A method of manufacturing golf balls composed of a core and a cover of one or more layer that encloses the core, at least one cover layer being made of a thermoplastic polyurethane composition characterized by including at least 90 wt % of a thermoplastic polyurethane obtained by a polyurethane-forming reaction between a long-chain polyol, an organic diisocyanate compound and a chain extender, which thermoplastic polyurethane composition cover layer has an inherent viscosity in a DMF solvent of larger than 1.5 dl/g and an inherent viscosity in a 0.05 mol/L n-butylamine-containing DMF solution of larger than 0.5 dl/g, the golf ball manufacturing method being characterized in that the thermoplastic polyurethane composition cover layer is composed of two kinds of thermoplastic polyurethane or polyurethane composition A and B which satisfy the condition that the inherent viscosity of "B" in DMF is larger than the inherent viscosity of "A" in DMF and the condition that the inherent viscosity of "B" in 0.05 mol/L n-butylamine-containing DMF solution is larger than the inherent viscosity of "A" in 0.05 mol/L n-butylamine-containing DMF and which have been blended in proportions that satisfy the following conditions:

$A1 < 500$ ppm $B1 < 5{,}000$ ppm $100/1 \geq A2/B2 \geq 100/150$ $(A1 \times A2 + B1 \times B2)/(A2 + B2) \leq 3{,}000$ ppm (wherein A1 is the moisture content in thermoplastic polyurethane or polyurethane composition A, A2 is the weight of thermoplastic polyurethane or polyurethane composition A, B1 is the moisture content in thermoplastic polyurethane or polyurethane composition B, and B2 is the weight of thermoplastic polyurethane or polyurethane composition B).

The golf ball manufacturing method is characterized in that B is recycled A.

DETAILED DESCRIPTION OF THE INVENTION

The invention is described more fully below.

The inventive method of manufacturing golf balls composed of a core and a cover of one or more layer that encloses the core, at least one cover layer being made of a thermoplastic polyurethane composition characterized by including at least 90 wt % of a thermoplastic polyurethane obtained by a polyurethane-forming reaction among a long-chain polyol, an organic diisocyanate compound and a chain extender, which thermoplastic polyurethane composition cover layer has an inherent viscosity in a DMF solvent of larger than 1.5 dl/g and an inherent viscosity in a 0.05 mol/L n-butylamine-containing DMF solution of larger than 0.5 dl/g, is characterized by conditioning the thermoplastic polyurethane to a pre-processing moisture content of 500 ppm or less, then injection molding the moisture-conditioned thermoplastic polyurethane to form the thermoplastic polyurethane composition cover layer.

The thermoplastic polyurethane in the invention has a structure which includes soft segments made of a polymeric polyol that is a long-chain polyol (polymeric glycol), and hard segments made of a chain extender and an organic diisocyanate. Here, the polymeric polyol used as a starting material is not subject to any particular limitation, and may be any that has been used in the prior art relating to thermoplastic polyurethanes. Examples include polyester polyols and polyether polyols, although polyether polyols are preferable to polyester polyols because they enable the synthesis of thermoplastic polyurethanes having a high rebound resilience and excellent low-temperature properties.

Illustrative examples of polyether polyols include polytetramethylene glycol and polypropylene glycol, although polytetramethylene glycol is especially preferred in terms of the rebound resilience and low-temperature properties. The polyether polyol has a number-average molecular weight of preferably 1,500 to 5,000, with a molecular weight of 2,000 to 4,000 being especially preferred for the synthesis of thermoplastic polyurethane having a high rebound resilience.

In this specification, "number-average molecular weight" refers to the number-average molecular weight computed based on the hydroxyl number measured in accordance with JIS K-1557.

Chain extenders suitable for use include those used in the prior art relating to thermoplastic polyurethanes. For example, low-molecular-weight compounds which have a molecular weight of not more than 400 and bear on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is especially preferred.

Suitable organic diisocyanates include those used in the prior art relating to thermoplastic polyurethanes. Illustrative, non-limiting, examples include aromatic diisocyanates such as 4,4'-diphenylmethane diisocyanate, 2,4-toluene diisocyanate and 2,6-toluene diisocyanate; and aliphatic diisocyanates such as hexamethylene diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

The thermoplastic polyurethane in the invention is most preferably one synthesized using a polyether polyol and an aromatic diisocyanate, and specifically one synthesized using polytetramethylene glycol having a number-average molecular weight of at least 2,000 as the polyether polyol and 4,4'-diphenylmethane diisocyanate as the aromatic diisocyanate.

The above thermoplastic polyurethane is prepared by a polyurethane-forming reaction of the organic diisocyanate compound with the long-chain polyol and the chain extender. By setting the content of nitrogen atoms in the thermoplastic polyurethane that originate from the organic diisocyanate compound, as a percentage of the combined weight of the long-chain polyol, organic diisocyanate compound and chain extender, within a range of 4.0 to 6.5 wt %, golf balls in which the above-mentioned properties such as rebound, spin characteristics, scuff resistance and manufacturability are even better can be obtained.

The ratio of active hydrogen atoms to isocyanate groups in the polyurethane-forming reaction can be set within a desirable range so as to enable golf balls made of a thermoplastic polyurethane composition that are endowed with even better properties such as rebound, spin characteristics, scuff resistance and manufacturability to be obtained.

No particular limitation is imposed on the method of preparing the thermoplastic polyurethane. Production may be carried out by either a prepolymer process or a one-shot process in which the long-chain polyol, chain extender and organic diisocyanate compound are used and a known urethane-forming reaction is carried out. Of these, a process in which melt polymerization is carried out in a substantially solvent-free state is preferred. Production by continuous melt polymerization using a multiple screw extruder is especially preferred.

The thermoplastic polyurethane is included as a major component in the thermoplastic polyurethane composition used in the cover of the inventive golf ball. Here, "major component" signifies that the thermoplastic polyurethane accounts for at least 90 wt %, preferably at least 95 wt %, more preferably at least 99 wt %, and up to 100 wt %, of the thermoplastic polyurethane composition.

In addition to the above thermoplastic polyurethane, the thermoplastic polyurethane composition may also include other ingredients. Examples of such other ingredients include thermoplastic polymers other than thermoplastic polyurethane, such as polyester elastomers, polyamide elastomers, ionomer resins, styrene block elastomers, polyethylene and nylon resins. The amount in which such thermoplastic polymers other than thermoplastic polyurethane are included, per 100 parts by weight of the thermoplastic polyurethane serving as the essential component therein, is generally 0 to 10 parts by weight, preferably 0 to 5 parts by weight, and more preferably 0 to 1 part by weight. This amount may be selected as appropriate for such purposes as adjusting the hardness, improving the resilience, enhancing the flow properties, and improving the adhesion of the cover stock.

If necessary, the cover stock may include also various additives other than the ingredients making up the above thermoplastic polyurethane. For example, additives such as pigments, dispersants, antioxidants, light stabilizers, ultraviolet absorbers and parting agents may be suitably included.

In the practice of the invention, the method of forming the cover layer may involve, for example, feeding the above cover stock to an injection molding machine and injecting the molten cover stock around the core so as to form the cover layer. The molding temperature varies with the type of thermoplastic polyurethane, but is generally in a range of 150 to 250° C.

If injection molding is carried out, it is desirable, though not essential, to carry out a nitrogen purge or vacuum treatment at some or all places on the resin paths from the resin feed area to the mold interior, and thus carry out molding in a low-humidity environment.

Here, in the practice of the invention, when the cover layer is formed, the thermoplastic polyurethane composition or thermoplastic polyurethane to be used as the cover material has a pre-processing moisture content of generally 500 ppm or less, preferably 300 ppm or less, and more preferably 100 ppm or less. A pre-processing moisture content within the thermoplastic polyurethane composition or thermoplastic polyurethane in excess of 500 ppm may result in undesirable effects such as foaming during the molding operation and in a rise in the resin viscosity, and may also be accompanied by declines in the physical properties in view of property requirements for golf ball covers.

A thermoplastic polyurethane composition or thermoplastic polyurethane conditioned to a moisture content of 500 ppm or less can be obtained by using equipment effective for moisture removal, such as a vacuum drier, a hot-air drier or a dehumidifying dryer to carry out treatment, preferably within a temperature range of 40 to 150° C. for a period of 1 to 10 hours. Treatment in a dried atmosphere of air or nitrogen, for example, having a dew point of −20° C. or below is more preferred.

A commercial product may be used for this purpose, provided it is a thermoplastic polyurethane composition or thermoplastic polyurethane conditioned to a moisture content of 500 ppm or less.

In the practice of the invention, when the cover layer is molded, it is also advantageous to suitably pulverize runners and the like that form during injection molding (here, "runners" refers to excess resin that has solidified in the mold channels for uniformly feeding molten resin during injection molding) to form a recyclable material, and either reuse this recyclable material as the cover stock or blend it with thermoplastic polyurethane composition composed primarily of newly synthesized thermoplastic polyurethane.

Here, when the above recyclable material is used as part of the cover stock, the pre-processing moisture content of the recyclable material is generally 5,000 ppm or less, and preferably 3,000 ppm or less. If the pre-processing moisture content of the recyclable material exceeds 5,000 ppm, the result may be undesirable effects such as foaming during molding, an increase in the viscosity of the resin, and a decline in the physical properties of the resulting cover.

Moreover, when this recyclable material is blended with a thermoplastic polyurethane composition composed primarily of newly synthesized thermoplastic polyurethane, the blending ratio, expressed as the weight ratio (thermoplastic polyurethane composition):(recyclable material), is typically from 100:1 to 100:150, and preferably from 100:100 to 100:25. If the proportion of recyclable material is too high, the moldability may worsen due to an increase in viscosity and the physical properties of the golf ball cover may decline.

After the cover stock has been molded as described above, its properties as a golf ball cover can be further improved by carrying out annealing so as to induce crosslinking reactions to proceed even further. "Annealing," as used herein, refers to aging the cover layer in a fixed environment for a fixed length of time.

The crosslinking reactions are believed to involve the reaction of remaining isocyanate groups with remaining hydroxyl groups in the thermoplastic polyurethane composition to form new urethane bonds, and addition reactions by remaining isocyanate groups with the urethane groups on the thermoplastic polyurethane to form allophanate or biuret crosslinks.

The annealing temperature can be set to generally at least 40° C., preferably at least 45° C., more preferably at least 50° C., and even more preferably at least 70° C. If the temperature during annealing is too low, this step may do little to induce the crosslinking reactions to proceed. On the other hand, in cases where the cover is composed of two or more layers and these cover layers include a layer formed of an ionomer resin, or in cases where the inventive golf ball is composed of a core, an intermediate layer enclosing the core, and a cover enclosing the intermediate layer, with the intermediate layer being made of an ionomer resin, if annealing is carried out at too high a temperature, the temperature may exceed the cluster melting point Ti of the ionomer resin, as a result of which the rebound of the golf ball may decrease. Also, exceeding the melting point Tm of the ionomer resin may result in deformation of the intermediate layer.

The relative humidity at the time of annealing is generally at least 50%, and preferably at least 60%, although it may be less than 50%. To form urea bonds and biuret bonds as strong crosslinks and thereby enhance the scuff resistance, a relative humidity of at least 50% is preferred. To suppress the bleedout of compounding chemicals and avoid an adverse impact on printability, a relative humidity of less than 50% is preferred.

No particular limitation is imposed on the means for carrying out such annealing. Annealing may be carried out in an oven, it may be carried out by installing a heat source place within the process and having the workpieces pass over that place, it may be carried out within a constant-temperature, constant-humidity chamber or an apparatus having a similar function, or it may be carried out within a liquid. Of these, from the standpoint of the ease of installing a heat source environment and the ability to selectively and efficiently form urea bonds and biuret bonds, it is preferable to carry out annealing within a liquid.

The annealing time may be set as appropriate for the annealing temperature, within a range that achieves the desired treatment effects. The annealing time is generally at least 30 minutes, preferably at least 1 hour, and most preferably at least 2 hours.

At least one of the one or more layers in the cover of the inventive golf ball is made of the above-described thermoplastic polyurethane composition. The cover layer made of this thermoplastic polyurethane composition has a surface hardness, expressed as the durometer D hardness, of generally 30 to 90, preferably 35 to 85, more preferably 40 to 80, and even more preferably 45 to 75. If the surface hardness of the cover layer is too low, the spin rate when the ball is hit with a driver may increase, shortening the carry of the ball. On the other hand, if the surface hardness of the cover layer is too high, the feel of the ball on impact may worsen and the urethane material may have a poor resilience and durability.

"Durometer D hardness" refers herein to the hardness measured with a type D durometer in accordance with JIS K7215.

The above-described cover layer has a rebound resilience of generally at least 35%, preferably at least 40%, more preferably at least 45%, and even more preferably at least 47%. Because thermoplastic polyurethane does not inherently have that good a resilience, it is desirable to scrupulously select the rebound resilience. If the rebound resilience of the cover layer is too low, the distance traveled by the golf ball may dramatically decrease. On the other hand, if the rebound resilience of the cover layer is too high, the initial velocity on shots of under 100 yards that require control and on putts may be too high and the feel of the ball when played may not agree with the golfer.

"Rebound resilience" refers herein to the rebound resilience obtained in accordance with JIS K7311.

The core in golf balls made by the inventive method is not subject to any particular limitation. For example, various cores that may be used include solid cores for two-pieces balls, solid cores having a plurality of vulcanized rubber layers, solid cores having a plurality of resin layers, and thread-wound cores having a rubber thread layer. No particular limitation is imposed on the diameter, weight, hardness, materials and other characteristics of the core.

In cases where golf balls made by the method of the invention have a construction that includes an intermediate layer, no particular limitation is imposed on the hardness, materials, thickness and other characteristics of the intermediate layer. If necessary, a primer layer may be provided to improve adhesion between the intermediate layer and the cover.

It is preferable for the cover layer to have a thickness within a range of 0.1 to 5.0 mm. The cover layer is not limited to a single layer, and may be formed with a multilayer construction. If the cover is formed with a multilayer construction, the overall thickness of the cover may be set within the foregoing range.

Golf balls obtained by the manufacturing method of the invention are preferably formed to a diameter and weight in accordance with the Rules of Golf, and are generally formed to a diameter of not less than 42.67 mm and a weight of not more than 45.93 g. The diameter is preferably from 42.67 to 42.9 mm. It is appropriate for deflection by the ball when subjected to a load of 980 N (100 kg) to be generally from 2.0 to 4.0 mm, and especially from 2.2 to 3.8 mm.

The golf ball manufacturing method of the invention is suitable for producing golf balls which have a high rebound, excellent spin characteristics and scuff resistance, are recyclable in a molding operation, and have an excellent manufacturability.

EXAMPLES

The following examples of the invention and comparative examples are provided by way of illustration and not by way of limitation.

(1) Melt Viscosity:

The melt viscosity of thermoplastic polyurethane that had been vacuum-dried under a pressure of 1,333.3 Pa (10 torr) or less at 120° C. for 1 hour was measured using a CFT-500D capillary rheometer manufactured by Shimadzu Corporation (nozzle dimensions: 1 mm diameter×10 mm length) under a load of 490.3 N (50 kgf) and at a temperature of 220° C.

Examples 1 to 10 and Comparative Examples 1 to 3

| Core Formulation | |
| --- | --- |
| Polybutadiene | 100 parts by weight |
| Zinc acrylate | 24.5 parts by weight |
| Zinc oxide | 12 parts by weight |
| Dicumyl peroxide | 1 part by weight |
| Zinc salt of pentachlorothiophenol | 1 part by weight |

The core material of the above formulation was kneaded, following which it was molded and vulcanized at 155° C. for 20 minutes, thereby obtaining a 38.5 mm diameter solid core for a two-piece solid golf ball. The polybutadiene rubber used was BR01 produced by JSR Corporation. The resulting core had a specific gravity of 1.17 g/cm³, a deflection of 3.4 mm under a load of 980 N (100 kg), and an initial velocity, measured in accordance with the USGA (R&A) measurement method, of 78.1 m/s.

The starting materials shown in Tables 1 to 3 (units: parts by weight) were worked at a temperature of 190° C. in a twin-screw extruder, thereby giving a cover stock.

The solid core was placed within a mold for injection molding and the cover stock was injection molded around the core, thereby giving two-piece golf balls in the respective examples of the invention and comparative examples, each having a 2.1 mm thick cover. Following injection molding of the cover stock, annealing treatment was administered under the respective conditions shown in the tables. The annealing time was 120 minutes. The resulting golf ball was held at room temperature for one week, following which the ball properties were evaluated. Measurement of the physical properties of the cover was carried out on samples prepared by injection molding a 2 mm thick sheet, subjecting the molded sheet to annealing treatment in the same way as described above, and holding the annealed sheet at room temperature for one week. The recyclability and manufacturability of the cover stock were also evaluated. The results are shown in Tables 1 to 3.

TABLE 1

| | | Example | | | | |
| --- | --- | --- | --- | --- | --- | --- |
| | | 1 | 2 | 3 | 4 | 5 |
| Thermoplastic polyurethane (parts by weight) | Polyurethane 1 | 100 | | | | |
| | Polyurethane 2 | | 100 | 100 | 100 | 100 |
| | Polyurethane 3 | | | | | |
| | Polyurethane 2R | | | | | |
| Titanium oxide (pbw) | | 3 | 3 | 3 | 3 | 3 |
| Polyethylene wax (pbw) | | 1 | 1 | 1 | 1 | 1 |
| Annealing treatment | 50° C. oven | ○ | ○ | | | |
| | 70° C. oven | | | ○ | | |
| | 50° C., 70% RH | | | | ○ | |
| | 50° C., 30% RH | | | | | ○ |
| | 50° C. water | | | | | |
| | Room temperature, in air | | | | | |
| Cover properties | Surface hardness (D hardness) | 60 | 63 | 63 | 63 | 63 |
| | Rebound resilience (%) | 50 | 51 | 51 | 51 | 51 |
| Ball properties | Diameter (mm) | 42.7 | 42.7 | 42.7 | 42.7 | 42.7 |
| | Weight (g) | 45.6 | 45.6 | 45.6 | 45.6 | 45.6 |
| | Hardness (mm) | 2.9 | 2.8 | 2.8 | 2.8 | 2.8 |
| | Initial velocity (m/s) | 76.9 | 76.8 | 76.1 | 76.8 | 76.8 |
| | Scuff resistance 23° C. | 5 | 4 | 5 | 5 | 5 |
| | 13° C. | 4 | 4 | 5 | 4 | 4 |
| | 0° C. | 4 | 4 | 4 | 4 | 4 |
| Recyclability | | yes | yes | yes | yes | yes |
| Manufacturability | | good | good | good | good | good |

TABLE 2

| | | Example | | | | |
| --- | --- | --- | --- | --- | --- | --- |
| | | 6 | 7 | 8 | 9 | 10 |
| Thermoplastic polyurethane (parts by weight) | Polyurethane 1 | | | 100 | | |
| | Polyurethane 2 | | 100 | | 100 | |
| | Polyurethane 3 | 100 | | | | 100 |
| | Polyurethane 2R | | 50 | | | |
| Titanium oxide (pbw) | | 3 | 3 | 3 | 3 | 3 |
| Polyethylene wax (pbw) | | 1 | 1 | 1 | 1 | 1 |
| Annealing treatment | 50° C. oven | | | ○ | | |
| | 70° C. oven | | | | | |
| | 50° C., 70% RH | | | | | |
| | 50° C., 30% RH | | | | | |
| | 50° C. water | ○ | | | | |
| | Room temperature, in air | | ○ | | ○ | ○ |
| Cover properties | Surface hardness (D hardness) | 64 | 63 | 60 | 63 | 64 |
| | Rebound resilience (%) | 51 | 51 | 50 | 51 | 51 |
| Ball properties | Diameter (mm) | 42.7 | 42.7 | 42.7 | 42.7 | 42.7 |
| | Weight (g) | 45.6 | 45.6 | 45.6 | 45.6 | 45.6 |
| | Hardness (mm) | 2.8 | 2.8 | 2.9 | 2.8 | 2.8 |
| | Initial velocity (m/s) | 76.8 | 76.1 | 76.9 | 76.8 | 76.8 |

TABLE 2-continued

|  |  | Example | | | | |
|---|---|---|---|---|---|---|
|  |  | 6 | 7 | 8 | 9 | 10 |
| Scuff | 23° C. | 5 | 4 | 4 | 4 | 4 |
| resistance | 13° C. | 5 | 3 | 4 | 4 | 4 |
|  | 0° C. | 4 | 3 | 4 | 3 | 3 |
| Recyclability |  | yes | yes | yes | yes | yes |
| Manufacturability |  | good | good | good | good | good |

TABLE 3

|  |  | Comparative Example | | |
|---|---|---|---|---|
|  |  | 1 | 2 | 3 |
| Thermoplastic polyurethane | Polyurethane 4 | 50 | 50 | 50 |
| (parts by weight) | Polyurethane 5 | 50 | 50 | 50 |
| Titanium oxide (pbw) |  | 3 | 3 | 3 |
| Polyethylene wax (pbw) |  | 1 | 1 | 1 |
| Isocyanate (pbw) |  | 20 | 20 | 20 |
| Annealing treatment | 50° C. oven |  | ○ |  |
|  | 70° C. oven |  |  | ○ |
|  | 50° C., 70% RH |  |  |  |
|  | 50° C., 30% RH |  |  |  |
|  | 50° C. water |  |  |  |
|  | Room temperature, in air | ○ |  |  |
| Cover | Surface hardness (D hardness) | 62 | 62 | 62 |
| properties | Rebound resilience (%) | 45 | 45 | 45 |
| Ball | Diameter (mm) | 42.7 | 42.7 | 42.7 |
| properties | Weight (g) | 45.7 | 45.7 | 45.7 |
|  | Hardness (mm) | 2.8 | 2.8 | 2.8 |
|  | Initial velocity (m/s) | 76.8 | 76.8 | 76.0 |
|  | Scuff  23° C. | 4 | 4 | 5 |
|  | resistance  13° C. | 4 | 4 | 4 |
|  | 0° C. | 3 | 3 | 4 |
| Recyclability |  | yes | yes | yes |
| Manufacturability |  | NG | NG | NG |

Polyurethane 1

Kuramiron 5D51-W21-XWF0 (produced by Kuraray Co., Ltd.): a 4,4'-diphenylmethane diisocyanate/1,4-butylene glycol/poly(tetramethylene glycol) (abbreviated below as "MDI-BD-PTMG") type thermoplastic polyurethane. Durometer D hardness, 51. Rebound resilience, 50%. Melt viscosity, 83 Pa·s.

Inherent viscosity in DMF solvent of polyurethane after molding, $\geq 2.0$ dl/g. Inherent viscosity in 0.05 mol/L n-butylamine-containing DMF solution of polyurethane after molding, 0.8 dl/g.

Pre-processing moisture content, 40 ppm.

Polyurethane 2

Kuramiron 5D54-W21-XWF1 (produced by Kuraray Co., Ltd.): a MDI-BD-PTMG type thermoplastic polyurethane. Durometer D hardness, 54. Rebound resilience, 51%. Melt viscosity, 75 Pa·s.

Inherent viscosity in DMF solvent of polyurethane after molding, $\geq 2.0$ dl/g. Inherent viscosity in 0.05 mol/L n-butylamine-containing DMF solution of polyurethane after molding, 0.9 dl/g.

Pre-processing moisture content, 35 ppm.

Polyurethane 2R

Recyclable material from above Polyurethane 2. Pre-processing moisture content, 3,000 ppm.

Polyurethane 3

Kuramiron 5D54-W21-FWX3 (produced by Kuraray Co., Ltd.): a MDI-BD-PTMG type thermoplastic polyurethane. Durometer D hardness, 54. Rebound resilience, 51%. Melt viscosity, 40 Pa·s.

Inherent viscosity in DMF solvent of polyurethane after molding, $\geq 2.0$ dl/g. Inherent viscosity in 0.05 mol/L n-butylamine-containing DMF solution of polyurethane after molding, 1.0 dl/g.

Pre-processing moisture content, 30 ppm.

Polyurethane 4

Pandex T8295 (produced by DIC Bayer Polymer, Ltd.): a MDI-PTMG type thermoplastic polyurethane. JIS-A hardness, 97. Rebound resilience, 44%. Inherent viscosity in DMF solvent of polyurethane after molding, 0.6 dl/g. Inherent viscosity in 0.05 mol/L n-butylamine-containing DMF solution of polyurethane after molding, 0.6 dl/g.

Pre-processing moisture content, 300 ppm.

Polyurethane 5

Pandex T8260 (produced by DIC Bayer Polymer, Ltd.): a MDI-PTMG type thermoplastic polyurethane. Durometer D hardness, 56. Rebound resilience, 46%. Inherent viscosity in DMF solvent of polyurethane after molding, 0.6 dl/g. Inherent viscosity in 0.05 mol/L n-butylamine-containing DMF solution of polyurethane after molding, 0.6 dl/g.

Pre-processing moisture content, 250 ppm.

Polyethylene Wax

Sanwax 161P (produced by Sanyo Chemical Industries, Ltd.)

Isocyanate

Crossnate EM-30 (an isocyanate master batch produced by Dainichi Seika Colour & Chemicals Mfg. Co., Ltd.)

Annealing Treatment

The 50° C., 70% RH and 50° C., 30% RH conditions were arrived at using a constant-temperature, constant-humidity chamber.

[Cover Properties]

Surface Hardness

The durometer D hardness was measured in accordance with JIS-K7215.

Rebound Resilience

The rebound resilience was measured in accordance with JIS-K7311.

[Ball Properties]

Hardness (mm)

The deflection when subjected to a load of 980 N (100 kg) was measured.

Initial Velocity (m/s)

Measured in accordance with the USGA (R&A) measurement method.

Scuff Resistance

The ball was held at respective temperatures of 23° C., 13° C. and 0° C. Using a swing robot machine, each ball was hit with a pitching wedge as the club at a head speed of 33 m/s, after which damage from the impact was visually rated according to the following criteria.

5: No damage at all or substantially free of apparent damage.
4: Slight damage observed, but of a substantially negligible degree.
3: Surface somewhat frayed.
2: Surface frayed and portions of dimples missing.
1: Some dimples completely obliterated.

Recyclability

The runners that formed during injection molding were pulverized and evaluated for reusability. Here, "runners" refers to excess resin that has solidified in the mold channels for uniformly feeding molten resin during injection molding. The runners formed in the production of molded articles made of thermoplastic resin are generally pulverized, mixed with resin, and reused.

Yes: Problems such as eccentricity did not arise even when up to 50% of pulverized runner resin was mixed with virgin resin and molded.

No: The runner resin gelled and subsequently did not melt when heated. In this state, reuse in molding was not possible.

Manufacturability

Good: Molding conditions during mass production were stable; problems such as resin scorching rarely occurred.

NG: Molding conditions during mass production were unstable; problems such as resin scorching frequently occurred.

The invention claimed is:

1. A method of manufacturing golf balls composed of a core and a cover of one or more cover layers that encloses the core, the method comprising:

forming at least one cover layer of a thermoplastic polyurethane composition that includes at least 90 wt % of a thermoplastic polyurethane obtained by a polyurethane-forming reaction between a long-chain polyol, an organic diisocyanate compound and a chain extender, the thermoplastic polyurethane composition cover layer having an inherent viscosity in a dimethylformamide solvent of larger than 1.5 dl/g and an inherent viscosity in a 0.05 mol/L n-butylamine-containing dimethylformamide solution of larger than 0.5 dl/g, wherein the thermoplastic polyurethane composition cover layer is composed of two kinds of thermoplastic polyurethane or polyurethane composition A and B which satisfy the condition that the inherent viscosity of "B" in dimethylformamide is larger than the inherent viscosity of "A" in dimethylformamide and the condition that the inherent viscosity of "B" in 0.05 mol/L n-butylamine-containing dimethylformamide solution is larger than the inherent viscosity of "A" in 0.05 mol/L n-butylamine-containing dimethylformamide and which have been blended in proportions that satisfy the following conditions:

$A1 < 500$ ppm $B1 < 5{,}000$ ppm $100/1 \geq A2/B2 \geq 100/150$ $(A1 \times A2 + B1 \times B2)/(A2+B2) \leq 3{,}000$ ppm (wherein $A1$ is the moisture content in thermoplastic polyurethane or polyurethane composition A, $A2$ is the weight of thermoplastic polyurethane or polyurethane composition A, $B1$ is the moisture content in thermoplastic polyurethane or polyurethane composition B, and $B2$ is the weight of thermoplastic polyurethane or polyurethane composition B).

2. The golf ball manufacturing method of claim 1 wherein B is recycled A.

* * * * *